United States Patent
He et al.

(10) Patent No.: US 6,557,042 B1
(45) Date of Patent: Apr. 29, 2003

(54) MULTIMEDIA SUMMARY GENERATION EMPLOYING USER FEEDBACK

(75) Inventors: Li-Wei He, Bellevue, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/273,296

(22) Filed: Mar. 19, 1999

(51) Int. Cl.[7] ............................................... G06F 15/16
(52) U.S. Cl. ...................... 709/231; 709/236; 709/223; 707/104.1; 707/1; 707/2; 707/5; 707/6; 707/10
(58) Field of Search ................................ 709/231, 232, 709/204, 203, 217, 219, 218, 236, 223; 707/2, 3, 5, 6, 10, 104.1, 1

(56) References Cited

U.S. PATENT DOCUMENTS

| | | | | |
|---|---|---|---|---|
| 5,572,651 A | * | 11/1996 | Weber et al. ............... 345/863 |
| 5,592,608 A | * | 1/1997 | Weber et al. ............... 345/863 |
| 5,799,292 A | | 8/1998 | Hekmatpour ................. 706/11 |
| 5,953,506 A | * | 9/1999 | Kalra et al. ................. 709/231 |
| 6,029,195 A | * | 2/2000 | Herz ........................... 709/219 |
| 6,195,654 B1 | * | 2/2001 | Wachtel .......................... 707/3 |
| 6,230,205 B1 | * | 5/2001 | Garrity et al. .............. 709/231 |
| 6,317,710 B1 | * | 11/2001 | Huang et al. ............... 704/246 |
| 6,366,956 B1 | * | 4/2002 | Krisnan ...................... 709/223 |
| 6,385,619 B1 | * | 5/2002 | Eichstaedt et al. ........ 707/104.1 |
| 6,446,130 B1 | * | 9/2002 | Grapes ........................ 709/231 |

OTHER PUBLICATIONS

Informedia—Internet References, http://www.informedia.cs.cmu.edu, date unknown.

* cited by examiner

Primary Examiner—Wellington Chin
Assistant Examiner—Chuong Ho
(74) Attorney, Agent, or Firm—Lee & Hayes, PLLC

(57) ABSTRACT

A multimedia server computer or other device can provide multimedia content, as well as summaries of the multimedia content, to one or more client computers. Each of the users of a client computer is identified as being part of a particular group and summaries are generated for each group. Each summary includes those portions of the multimedia content that are most interesting to previous users of the corresponding group.

32 Claims, 10 Drawing Sheets

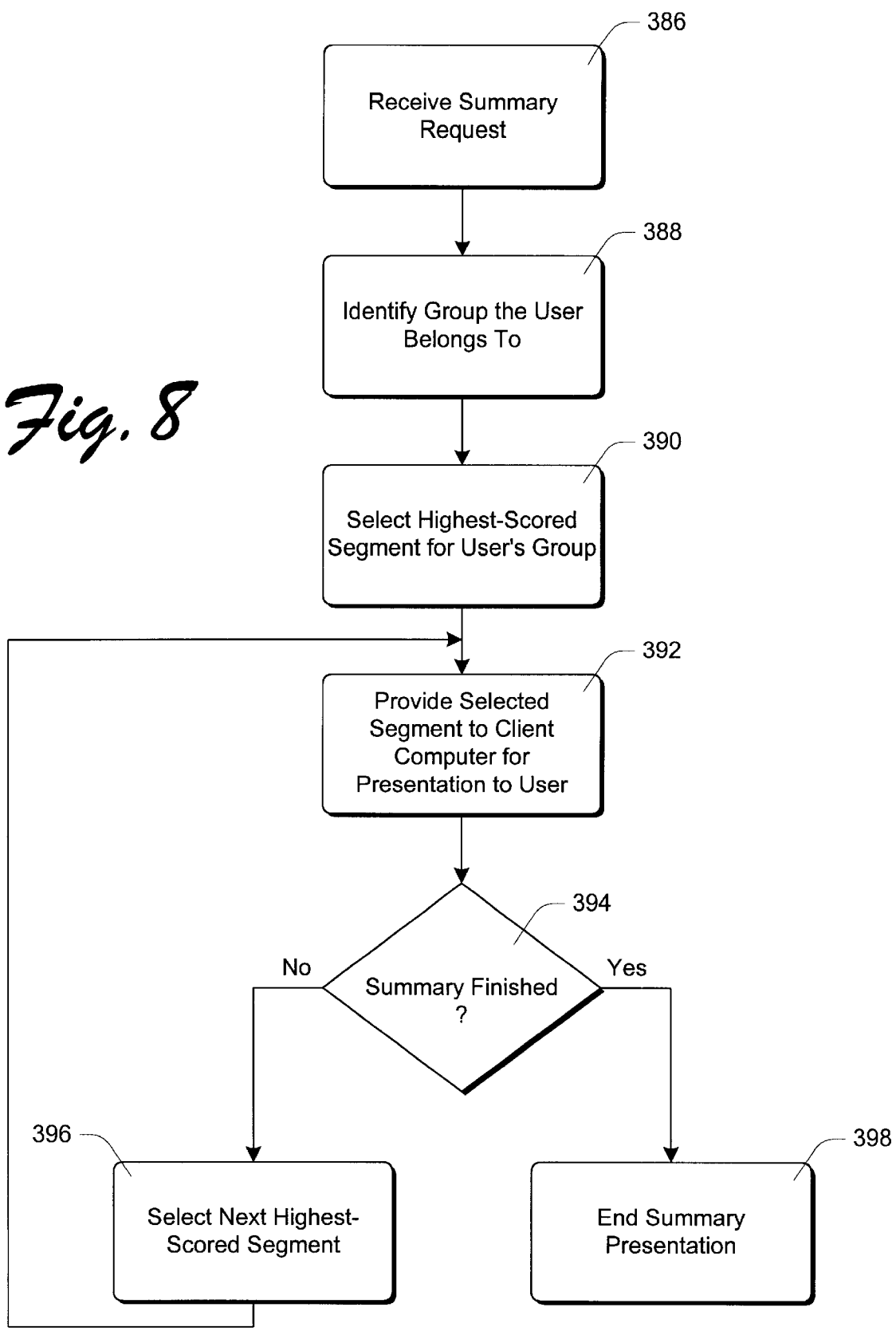

MULTIMEDIA SUMMARY GENERATION EMPLOYING USER FEEDBACK

TECHNICAL FIELD

This invention relates to multimedia content summarization. More particularly, the invention relates to generating and providing summaries of multimedia content based on user feedback.

BACKGROUND OF THE INVENTION

Multimedia streaming—the continuous delivery of synchronized media data like video, audio, text, and animation—is a critical link in the digital multimedia revolution. Today, streamed media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time time, as-needed basis, rather than being pre-delivered in its entirety before playback. Thus, the client computer renders streaming data as it is received from a network server, rather than waiting for an entire "file" to be delivered.

In comparison to text-based or paper-based presentations, multimedia presentations can be very advantageous. Synchronized audio/visual presentations, for example, are able to capture and convey many subtle factors that are not perceivable from paper-based documents. Even when the content is a spoken presentation, an audio/visual recording captures gestures, facial expressions, and various speech nuances that cannot be discerned from text or even from still photographs.

Although streaming multimedia content compares favorably with textual content in most regards, one disadvantage is that it requires significant time for viewing. It cannot be "skimmed" like textual content. Thus, a "summarized" version of the multimedia content would be very helpful.

Various technologies are available for summarizing or "previewing" different types of media content. For example, technology is available for removing pauses from spoken audio content. Audio content can also be summarized with algorithms that detect "important" parts of the content as identified by pitch emphasis. Similarly, techniques are available for removing redundant or otherwise "unimportant" portions or frames of video content. Similar schemes can be used with other types of media streams, such as animation streams and script streams.

Although such techniques are available for previewing media content, these techniques lack a semantic understanding of the multimedia content. These techniques rely on assumptions regarding the multimedia content based on the way in which the presentation is made (e.g., the manner in which words and sentences are spoken, the manner in which video frames are sequenced, etc.), rather than an understanding of the importance of the different portions of the multimedia content.

Furthermore, current techniques lack the ability to distinguish between different groups of users. Different groups of people (e.g., the sales department and the legal department of a corporation) may feel that different portions of the multimedia content are interesting. Current techniques do not provide any ability to distinguish between such different user interests.

The invention described below addresses these disadvantages of summarizing multimedia content, providing an improved way to summarize such content.

SUMMARY OF THE INVENTION

A system includes a multimedia server computer or other device that can provide multimedia content, as well as summaries of the multimedia content, to one or more client computers. Summaries are generated to include those portions of the multimedia content that are most interesting to previous users, as identified by feedback from the previous users. Thus, the summary presented to a user includes the portions identified as interesting by previous users.

According to one aspect of the invention, each of the users of a client computer is identified as being part of a group and different summaries are generated for each group. Each summary includes those portions of the multimedia content that are most interesting to previous users of the corresponding group. Thus, the summary presented to a user includes only the portions identified as interesting by previous similar users (that is, users in the same group).

According to another aspect of the invention, the summaries are continually updated as each user is presented with the multimedia content and/or a summary of the content. Feedback from each user is collected and used to further refine the summary. For example, a portion of the multimedia content may be dropped from the summary if feedback from subsequent users indicate the portion is not interesting.

According to another aspect of the invention, the multimedia content is separated into multiple different segments or portions. The segments may be pre-determined or alternatively may be dynamically defined. Each of these segments is given a different "score" for each group. These scores are then modified as user feedback is received. User feedback indicating a segment is interesting increases the score of that segment, while user feedback indicating a segment is not interesting decreases the score of that segment. The highest scoring segments are then provided as the summary of the multimedia content.

According to another aspect of the invention, the user feedback includes both explicit and implicit feedback. A user's inputs during presentation of the multimedia content and/or the summary of the multimedia content are monitored. Explicit feedback may be provided by the user, such as selection of a "this is interesting" button or a "this is not interesting" button. Additionally, implicit feedback may be provided by the user, such as selection of a fast forward button (implying the portion is not interesting) or selection of a rewind or replay button (implying the portion is interesting).

BRIEF DESCRIPTION OF THE DRAWINGS

The present invention is illustrated by way of example and not limitation in the figures of the accompanying drawings. The same numbers are used throughout the figures to reference like components and/or features.

FIG. 8 shows steps in an alternative process for generating and providing a summary of multimedia content employing user feedback.

DETAILED DESCRIPTION

General Network Structure

Figure 1:
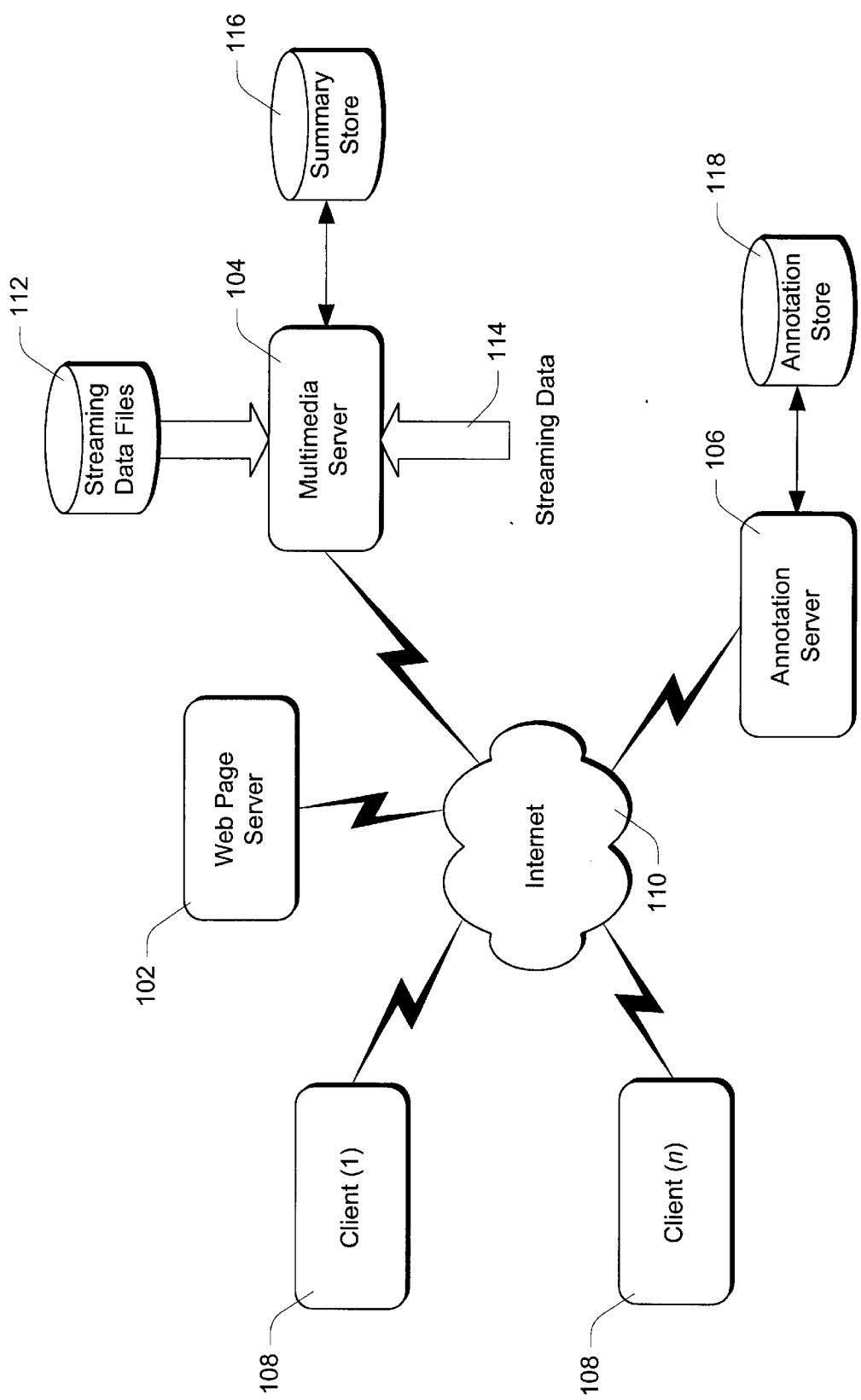
FIG. 1 shows a client/server network system and environment in accordance with the invention.

FIG. 1 shows a client/server network system and environment in accordance with the invention. Generally, the system includes multiple network server computers 102, 104, and 106, and multiple (n) network client computers 108. The computers communicate with each other over a data communications network. The communications network in FIG. 1 comprises a public network 110 such as the Internet. The data communications network might also include local-area networks and private wide-area networks.

Multimedia server 104 has access to streaming media content in the form of different media streams. These media streams can be individual media streams (e.g., audio, video, graphical, etc.), or alternatively composite media streams including one or more of such individual streams. Some media streams might be stored as files 112 in a database or other file storage system, while other media streams 114 might be supplied to the server on a "live" basis from other data source components through dedicated communications channels or through the Internet itself.

Multimedia server 104 also has access to a summary store 116. Summary store 116 provides storage for summary information used by server 104 in generating and providing summaries of the media streams accessible by server 104. Alternatively, summary store 116 may be part of server 104. User feedback to the media streams is provided to server 104 from client computers 108, and is used by server 104 to generate summaries for subsequent viewers.

In the discussions to follow, the multimedia content available to the client computers 108 is discussed as being streaming media. However, it should be noted that the invention can also be used with "pre-delivered" rather than streaming media, such as media previously stored at the client computers 108 via the network 110, via removable magnetic or optical disks, etc.

The system optionally includes an annotation server 106 that has access to annotations corresponding to the media content available to multimedia server 104. The annotation server 106 maintains the annotations in an annotation store 118. An annotation is data (e.g., audio, text, video, etc.) that corresponds to multimedia content. The annotations typically correspond to a particular temporal location or temporal range in the multimedia content and generally provide a user's input (e.g., a question, comment, elaboration, etc.) regarding the content at that location or range.

When a user of a client computer 108 accesses a web page containing streaming media, a browser (not shown) of the client computer 108 contacts the web server 102 to request a Hypertext Markup Language (HTML) page. The client-based browser also submits requests to the media server 104 for streaming data and optionally to the annotation server 106 for any annotations associated with the streaming data. When a user of a client computer 108 desires to add or retrieve annotations, the client computer 108 communicates with the annotation server 106 to perform the desired addition/retrieval. The client computers 108 communicate with the servers 102, 104, and 106 via any of a wide variety of known protocols, such as the Hypertext Transfer Protocol (HTTP).

Streaming Media

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation. The individual timelines define the timeline of the composite stream.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data sets or units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data units of a composite media stream are interleaved in a single sequence of data packets.

Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes its presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
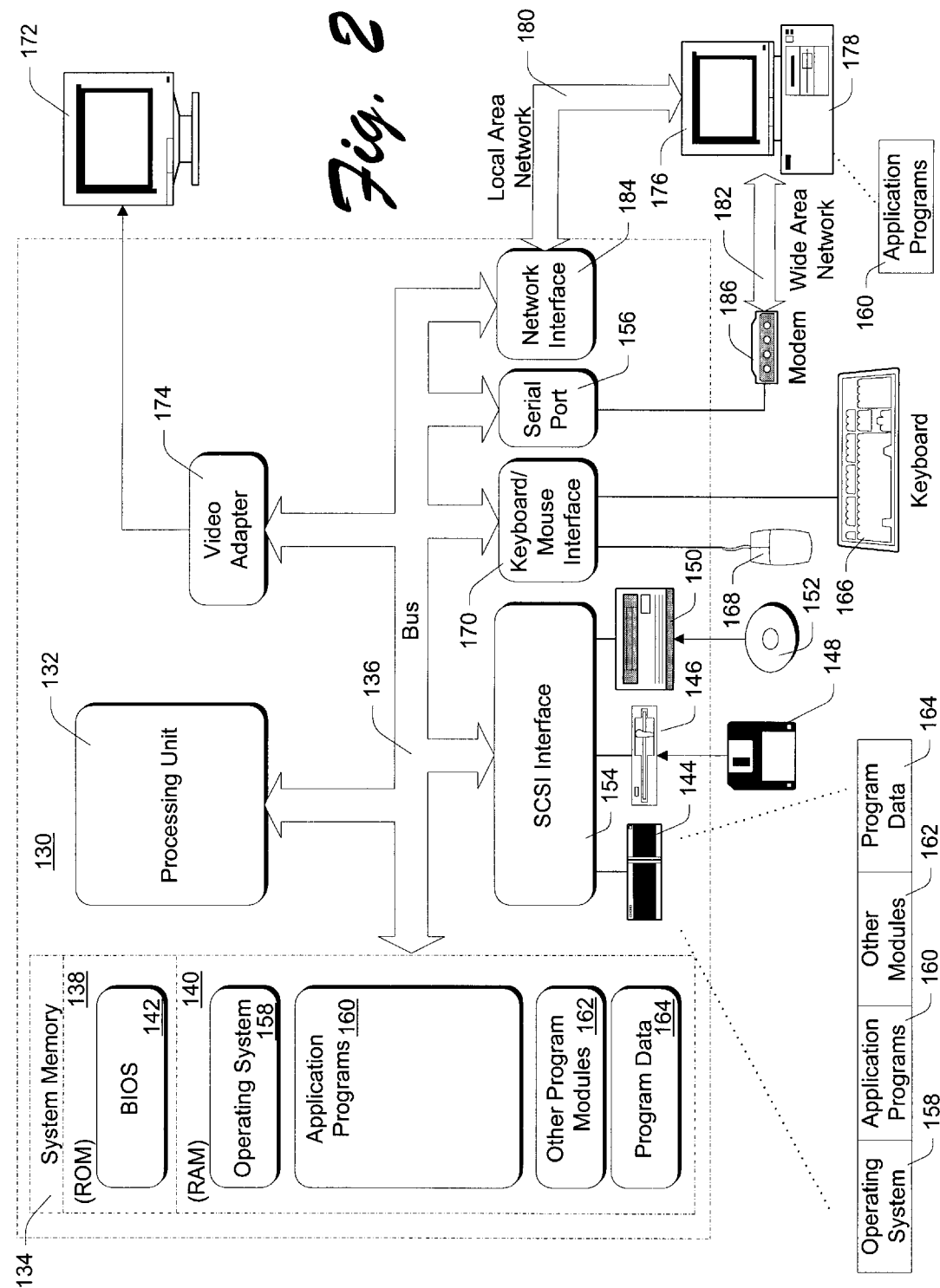
FIG. 2 shows a general example of a computer that can be used as a server or client in accordance with the invention.

FIG. 2 shows a general example of a computer 130 that can be used as a server or client in accordance with the invention. Computer 130 is shown as an example of a computer that can perform the functions of server computers 102, 104, or 106, or a client computer 108 of FIG. 1.

Computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer readable instructions, data structures, program modules and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 148, optical disk 152, ROM 138, or RAM 140, including an operating system 158, one or more application programs 160, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet. In the described embodiment of the invention, remote computer 176 executes an Internet Web browser program such as the "Internet Explorer" Web browser manufactured and distributed by Microsoft Corporation of Redmond, Wash.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Multimedia Server and Summary Information

Figure 3:
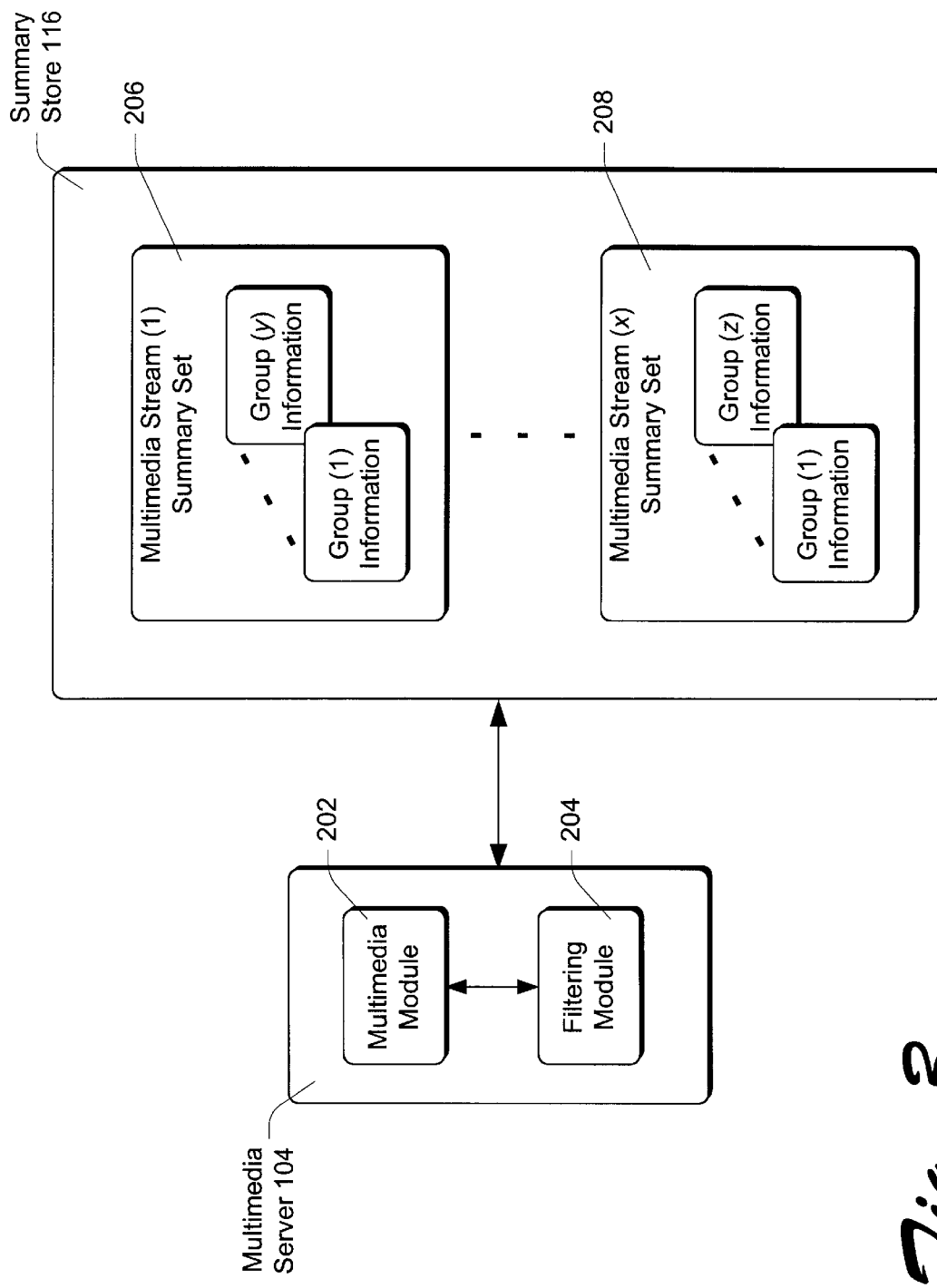
FIG. 3 shows an exemplary multimedia server computer and associated summary store in accordance with the invention.

FIG. 3 shows an exemplary multimedia server computer and associated summary store. Multimedia server 104 includes a multimedia module 202 and a filtering module 204. Module 202 manages the provision of multimedia summaries to the client computers for presentation to the users. Filtering module 204 processes the feedback received from users regarding the multimedia content and/or multimedia summaries and generates the summaries for the multimedia content. Information identifying the multimedia segments that make up a summary for a particular multimedia stream is maintained in summary store 116.

A summary for a multimedia stream is generated by combining different segments of the multimedia stream together. These segments are the portions of the multimedia stream that are determined by the invention to be of most interest to the user. Segments may be of the same or differing lengths. The points of separation in the media stream that delineate the different segments can be generated in a variety of different manners. Conventional processing techniques can be used (such as pause detection) to try to identify different thoughts, ideas, or statements by the presenter. Each portion of the multimedia stream between two pauses can thus be a segment. Alternatively, a linear separation could be used to delineate the segments, such as each segment being a 15-second portion of the multimedia stream. Alternatively, the segment delineation could be done manually. For example, the original presenter in the multimedia stream may identify what the segments should be. The segment delineation can be done statically or alternatively dynamically based on previous user feedback during presentation of the multimedia stream. For example, segments can be delineated based on portions of the stream that are replayed, portions that are skipped, where stream presentation is paused, etc. when presented to users. It should be noted that the user may or may not be aware of the segment delineation.

According to one aspect of the invention, the portions of the multimedia stream that are determined to be of most interest to the user are modified to provide a "smoother" summary. Additional data from the multimedia stream immediately preceding and/or immediately succeeding the portion may be added to the portion so that the segments in the summary have a threshold length (e.g. at least 15 seconds), thereby avoiding the "choppiness" that can result from having many very short portions. Additional data from the multimedia server immediately preceding and/or immediately succeeding the portion can also be added so that the segment begins at the beginning of a phrase and ends at the ending of a phrase (as determined, for example, using conventional pause detection techniques).

The summary store 116 maintains summary information for multiple (x) multimedia streams, illustrated as summary information sets 206 and 208. Additionally, each of the information sets 206 and 208 includes different summary information for different groups. The summary information for each group identifies which segments of the multimedia stream are to be used to create the summary for that group. As the users in the different groups may have different interests, the summary information for each group may differ. Additionally, a summary list is maintained by summary store 116. The summary list is a listing of segments (e.g., start and end times of the corresponding portion of multimedia content). Alternatively, the summary list may be fields corresponding to each segment in the group information that are flagged to indicate the segments that are to be part of the summary.

When a request is made by a user of a client computer 108 of FIG. 1 to receive summary information for a multimedia stream, multimedia module 202 identifies the group to which the user belongs and the appropriate summary information. The appropriate summary information is identified based on the multimedia stream and the user's group, and in turn is used by module 202 to identify a particular set of summary information from summary store 116. Using the summary information, multimedia module 202 provides appropriate segments of the multimedia stream (as identified by the summary information) to the client computer for presentation to the user. Alternatively, server 104 may provide all of the summary information from summary store 116 to client computer 108. Client computer 108 can then identify the particular set of summary information and provide that set to module 202, which in turn provides the appropriate segments of the multimedia stream to client 108 for presentation to the user.

Alternatively, rather than maintaining only summary information identifying segments of the multimedia stream, multimedia data itself may be maintained in summary store 116. Thus, multimedia module 202 could simply provide data stored in summary store 116 to client computers 108 of FIG. 1 as a summary rather than using the data stored in summary store 116 as an index into the multimedia stream.

Multimedia module 202 identifies the group to which the user belongs based on information received from client computer 108 (FIG. 1). Users may be separated into different groups, or alternatively all users may be part of the same group. The client computer 108 provides either group information for the user to the multimedia module 202, or alternatively provides a user identifier to the multimedia module 202 from which the module 202 determines the appropriate group. The group is identified by comparing the user identifier (e.g., a "log-in" identifier of the user) to a programmed or pre-determined set of user identifiers and corresponding group identifiers.

Alternatively, the group information can be inferred from the location of the client computer 108 (e.g., the computer is physically situated in the legal department) or alternatively based on user-identification of the group (e.g., selection of a radio button or menu option). Alternatively, the group to which a user belongs may be implicitly determined based on the access patterns of the user for the multimedia stream. For example, portions of the multimedia stream that are accessed by the user may be compared to portions accessed by previous users, and the user's group identified based on the group to which previous users accessing similar portions belong.

Figure 4:
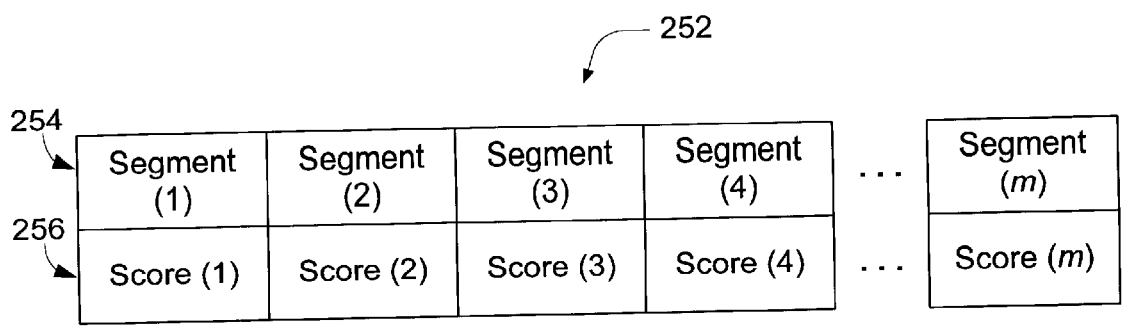
FIG. 4 shows exemplary summary information in accordance with the invention.

FIG. 4 shows exemplary summary information 252 in accordance with the invention. Summary information 252 includes multiple (m) segment identifiers 254 and corresponding segment scores 256 for one group of a multimedia set 206 or 208 of FIG. 3. As discussed above, the summary segments may be statically or dynamically defined, and may be of the same or different lengths. Summary information 252 includes an identifier 254 and segment score 256 for each segment of the corresponding multimedia content, regardless of whether the segment is part of the summary. Each of the segment identifiers 254 identifies a particular segment of the corresponding multimedia stream (e.g., by start and end time offsets into the multimedia stream). Each of the segment scores 256 corresponds to one of the segment identifiers 254, and thus to the corresponding segment of the multimedia stream, and provides a "ranking" or "interest value" for that segment. Different segments can have different scores, indicating different levels of user interest in the corresponding segments.

The segment scores 256 are generated by filtering module 204 of FIG. 3 based on user feedback received via client computers 108 of FIG. 1. A user of a client computer 108 can provide feedback regarding a multimedia stream while being presented with the multimedia stream. Additionally, as the summary is one or more segments of the multimedia stream, a user can also provide feedback while being presented with the summary.

User feedback can be either explicit or implicit. By way of example, positive and negative feedback indicators can be presented to the user (e.g., on-screen "buttons" or "hot spots", or menu options labeled "This Portion is Interesting" and "This Portion is Boring"). Implicit feedback can be provided in a variety of manners, such as determining when a user watches/listens to a segment numerous times (implicitly indicating the user liked the segment), when a user skips or fast forwards over a segment (implicitly indicating the user did not like the segment), when a user jumps to a particular segment, which segments the user watches/listens to and those the user does not, etc. By way of further example, selection of a "fast forward" option to skip over a segment at the beginning of the segment may result in a greater modification than selection of the option at the end of the segment.

The filtering module 204 modifies the segment scores 256 in response to the user feedback. Positive feedback for a multimedia segment increases the corresponding segment score, while negative feedback for the multimedia segment decreases the corresponding segment score. The amount by which the segment scores are modified may be different for different types of feedback. For example, explicit feedback may result in a greater modification (e.g., increase or decrease by two) than implicit feedback (e.g., increase or decrease by one).

User feedback received regarding a particular segment is used to modify the score of that segment. The segment score that is part of the summary information corresponding to the group that the user is part of is modified; segment scores for summary information corresponding to other groups is not modified. Alternatively, there may be relationships between different groups that result in summary information for multiple different groups being modified. For example, there may be a relationship defined between a "marketing" group and an "engineering" group, such that user feedback from a user in the marketing group also modifies the corresponding segment score in the engineering group. This modification may be the same (e.g., increase both scores by two for positive feedback), or different (e.g., for positive feedback increase the segment score in the user's group by two and increase the segment score in the related group by one).

The filtering module 204 of FIG. 3 uses the segment scores for a group to identify which multimedia segments are to be part of the summary. The higher the segment score, the more interesting the segment is deemed to be to users of that group. The highest scored segments are provided by filtering module 204 as the summary. Thus, the invention employs the feedback from current and previous users to generate summaries for subsequent users.

The number of multimedia segments that are used to generate a summary can be determined in a variety of different manners, and can vary for different groups. For example, a summary may have a limited duration, so the highest scored segments are added to the summary until that duration is satisfied. Alternatively, all segments having greater than a particular score may be provided, regardless of the overall time. Alternatively, segments may be presented to the user in order of their corresponding scores (highest to lowest) with no time limit, continuing until the user requests that the summary stop.

The segments are presented to the user in their chronological order, based on their presentation times. Alternatively, the ordering of the multimedia segments in the summary list can dictate the order in which the segments are presented to the user. Therefore, when segments are added to the summary list in order from highest to lowest score, the segments having the highest score (and thus deemed to be most interesting to the user) are provided first.

The generation of the summaries can occur at different times. For example, a new summary could be generated each time a user is finished viewing the corresponding multimedia stream or the current summary or after a set of users have viewed the multimedia stream or summary. Alternatively, a new summary could be generated each time a user requests a summary of the multimedia stream. Additionally, the summaries could be generated prior to provision to the client computer, or alternatively could be generated "on the fly" (e.g., the next segment in the summary could be determined while the current segment is being provided to the client computer). Either way, a new summary is generated that allows the feedback from the previous users to influence which segments are included in the summary the next time a user requests the summary.

Additionally, it should be noted that in certain situations (e.g., when the multimedia content is first available) there may be insufficient user feedback to generate a summary based on previous users' feedback. In these situations a default or pre-programmed summary generated in a conventional manner (e.g., pitch analysis) can be provided to the user until there is sufficient user feedback.

Additionally, it should be noted that the employment of user feedback in accordance with the invention could be done in conjunction with other summarization or previewing techniques. For example, a pitch analysis technique could be used on the summary generated by employing the user feedback in order to generate a revised summary, or alternatively the pitch analysis technique could be used on the multimedia stream initially and then the summary generated by employing the user feedback. By way of another example, each segment of the multimedia stream can be defined as the portion of the stream corresponding to a particular slide or presentation foil. User feedback can be employed to determine which of those segments are most important, and then using as the summary the beginning pieces (the duration of each piece being based on the duration of the segment) of those most important segments.

User Experience

Figure 5:
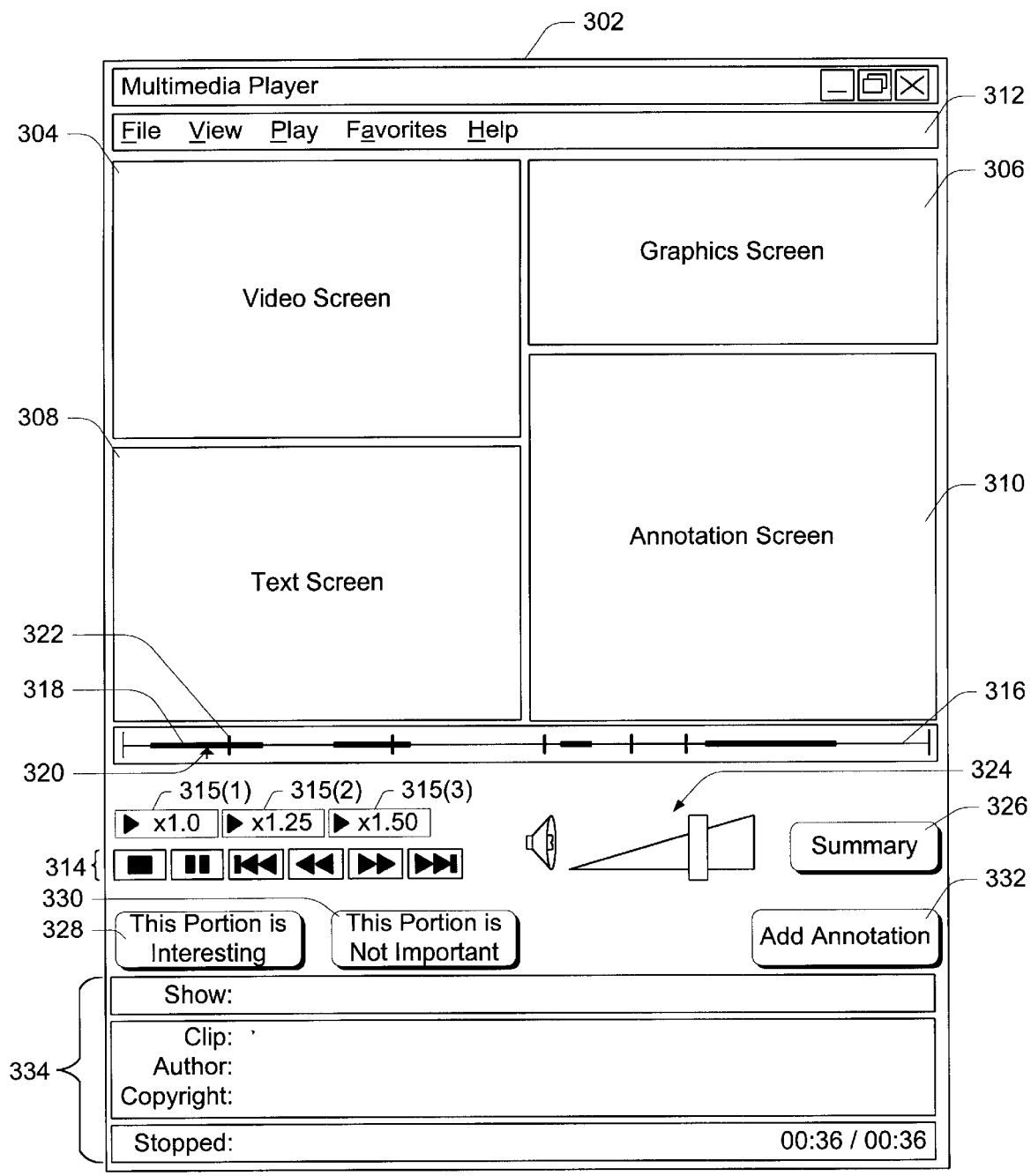
FIG. 5 shows an exemplary graphical user interface window that displays multimedia content at a client computer.

FIG. 5 shows an exemplary graphical user interface (UI) window 302 that displays multimedia content at a client computer 108 of FIG. 1. The user interface is provided by an application program executed at the client computer 108, referred to herein as a multimedia player. The multimedia player may be incorporated into the operating system or run as a separate, self-contained application. In either case, the multimedia player operates in a graphical user interface windowing environment such as provided by the "Windows" brand of operating systems, available from Microsoft Corporation of Redmond, Wash. This UI window 302 includes a video screen 304, a graphics screen 306, a text screen 308, and an annotation screen 310.

Video screen 304 is the region of the UI within which the video portion of the multimedia content is rendered. If the multimedia content does not include video data, screen 304 displays static or dynamic images representing the content. For audio content, for example, a dynamically changing frequency wave that represents an audio signal can be displayed in screen 304.

Graphics screen 306 is the region of the UI within which the graphics portion of the multimedia content is rendered. The graphics portion can include, for example, a set of slides or presentation foils that correspond to the video portion. If the multimedia content does not include graphics data, then the graphics screen 306 is left blank (or an indication given that no graphics are available).

Text screen 308 is the region of the UI within which the text portion of the multimedia content is rendered. The text portion can include, for example, a table of contents that outlines the multimedia content or a textual version of the audio being played. If the multimedia content does not include text data, then the text screen 308 is left blank (or an indication given that no graphics are available).

Annotation screen 310 is the region of the UI within which annotations corresponding to the multimedia content, if any, are rendered. For video, graphical, and text annotations, the video, graphical, or text content of the annotation is displayed on screen 310. For non-visual content, screen 310 displays static or dynamic images representing the annotation content, such as the title or summary of the annotation, or a dynamically changing frequency wave in the case of audio content. If there are no annotations corresponding to the current multimedia content being presented, then the annotation screen 310 is left blank (or an indication given that no graphics are available).

The UI window 302 also includes a command bar 312, shuttle controls 314, a timeline 316, a volume control 324, a summary button 326, user feedback buttons 328 and 330, add annotation button 332, and content information space 334. Command bar 312 lists familiar UI commands, such as "File", "View", and so forth.

Shuttle controls 314 allow the user to control playback of the multimedia content. Shuttle controls 314 include a stop button, a pause button, rewind buttons, fast forward buttons, and play buttons. Selection of the fast forward (or rewind buttons) can cause the multimedia player to jump ahead or back in the media presentation by a predetermined amount (e.g., one second, five seconds, to the next segment, etc.). Three different play buttons 315(1), 315(2), and 315(3) are included corresponding to different playback speeds. The multimedia player, either on its own or in coordination with the multimedia server, can present multimedia content at different speeds, thereby allowing the content to be presented to the user at a slower speed (referred to as the presentation being time-expanded) or a faster speed (referred to as the presentation being time-compressed). There are various known methods of modifying the speed at which multimedia content is presented to a user. Thus, these methods will not be discussed further except as they pertain to the invention.

Play buttons 315(1)–315(3) are associated with different playback speeds of the multimedia content. In this illustration, play button 315(1) corresponds to a normal playback speed (i.e., "x1.0"), play button 315(2) corresponds to a faster playback speed with a speed up factor of 25% (i.e., "x1.25"), and play button 315(3) corresponds to an even faster playback speed with a speed up factor of 50% (i.e., "x1.50"). It is noted, however, that more or less than three buttons may be used (e.g., two, four, five, etc.) and may correspond to speeds both above and below the normalized speed of "x1.0".

The user can actuate one of the play buttons via a UI actuation mechanism, such as a pointer 226 or by tabbing to the desired play button and hitting the "enter" key. Upon selection of a play button, the multimedia player plays the multimedia content at the playback speed associated with the selected play button. For instance, if the user selects play button 315(2) with a 25% speedup factor, the multimedia player plays the content at a playback speed of 1.25 times the original or default playback speed.

The user can actuate any of the buttons of the shuttle controls 314 via a UI actuation mechanism, such as a pointer or by tabbing to the desired play button and hitting the "enter" key. Upon selection of a button, the multimedia player performs the requested action (e.g., stops or pauses playback, rewinds, etc.).

Timeline 316 provides a temporal representation of the multimedia content along with bars 318 that indicate which portions of the multimedia content are being presented as the summary of the multimedia content. Additionally, an arrow 320 indicates the position in the multimedia content currently being rendered, while slide change markers 322 indicate the points in the multimedia content where the graphics portion changes (e.g., when the graphics portion comprises a set of slides, markers 322 indicate when the slide being presented changes).

Volume control 324 allows the user to adjust the volume of the audio portion of the multimedia content.

Summary button 326 allows the user to request a summary of the multimedia content being rendered on the screens 304–308. The user can actuate the summary button 326 via a UI actuation mechanism as discussed above. Upon activation, the media player forwards an indication of the user summary request to multimedia server 104 of FIG. 1. Multimedia server 104, using the stored summary information and the identity of the user, provides the appropriate multimedia segments to client computer 108 of FIG. 1 as the summary. It should be noted that the UI window 302 can remain the same when rendering the multimedia summary segments, or may be changed to indicate that the computer is now presenting the multimedia content in a summary mode.

User feedback buttons 328 and 330 allow a user to provide explicit feedback regarding their level of interest in a particular portion of the multimedia content. User actuation of the positive feedback button 328 causes the multimedia player to provide an indication to multimedia server 104 of FIG. 1 that the user selected the positive feedback button. Similarly, user actuation of the negative feedback button 330 causes the multimedia player to provide an indication to multimedia server 104 that the user selected the negative feedback button. In addition with providing an indication that one of the user feedback buttons 328 or 330 was selected, the multimedia player also provides the current presentation time of the multimedia content when the button 328 or 330 was selected. Providing this current presentation time allows the multimedia server 104 to determine which segment the feedback corresponds to.

Add annotation button 332 allows a user to add an annotation to the multimedia content currently being displayed. Selection of the add annotation button 332 causes an additional annotation generation interface (not shown) to be displayed to the user. The annotation creation interface allows the user to create the annotation and have the annotation stored by annotation server 106 of FIG. 1. Any of a variety of known techniques for maintaining multimedia annotations can be used by annotation server 106. Thus, these techniques will not be discussed further except as they pertain to the invention.

Content information space 334 lists information pertaining to the multimedia content being rendered on the screens 304–308. The content information space includes the show name, author and copyright information, and tracking/timing data.

Summary Generation and Presentation

Figure 6:
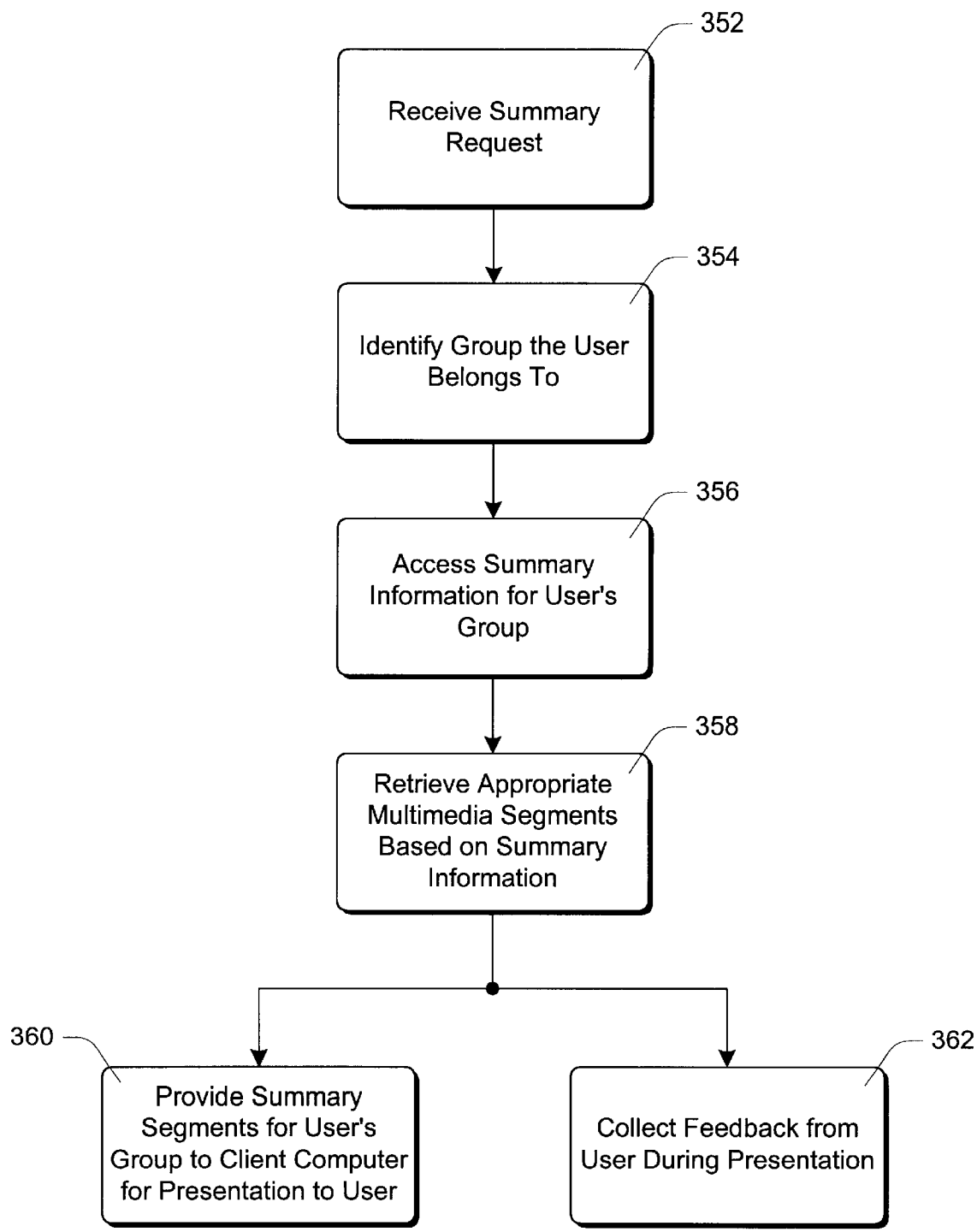
FIG. 6 shows exemplary steps in a process for providing a summary of multimedia content to a user employing user feedback.

FIG. 6 shows exemplary steps in a process for providing a summary of multimedia content to a user employing user feedback. These steps are implemented by multimedia server 104 of FIG. 1 and may be performed in software. FIG. 6 is described with additional reference to components in FIGS. 1 and 3.

Initially, multimedia server 104 (FIG. 1) receives a summary request, initiated by a user, from a client computer 108 (FIG. 1), step 352. Upon receipt of the summary request, multimedia server 104 identifies the group that the user belongs to, step 354.

The multimedia server 104 then accesses the summary information for the user's group, step 356. Using this summary information, multimedia server 104 retrieves the appropriate segments of the multimedia content, step 358, and provides the segments to the client computer 108 for presentation to the user, step 360. Concurrent with the provision of the summary segments to the client computer 108, multimedia server 104 also receives user feedback, step 362. As discussed above, this user feedback is provided by the user to client computer 108, which in turn forwards the feedback to multimedia server 104. The user feedback can be provided to server 104 as it is provided by the user, or alternatively client computer 108 can collect the feedback in a log and subsequently provide the entire log of user feedback to server 104.

Alternatively, the steps 352–358 may be implemented by client computer 108 of FIG. 1 rather than multimedia server 104.

Figure 7:
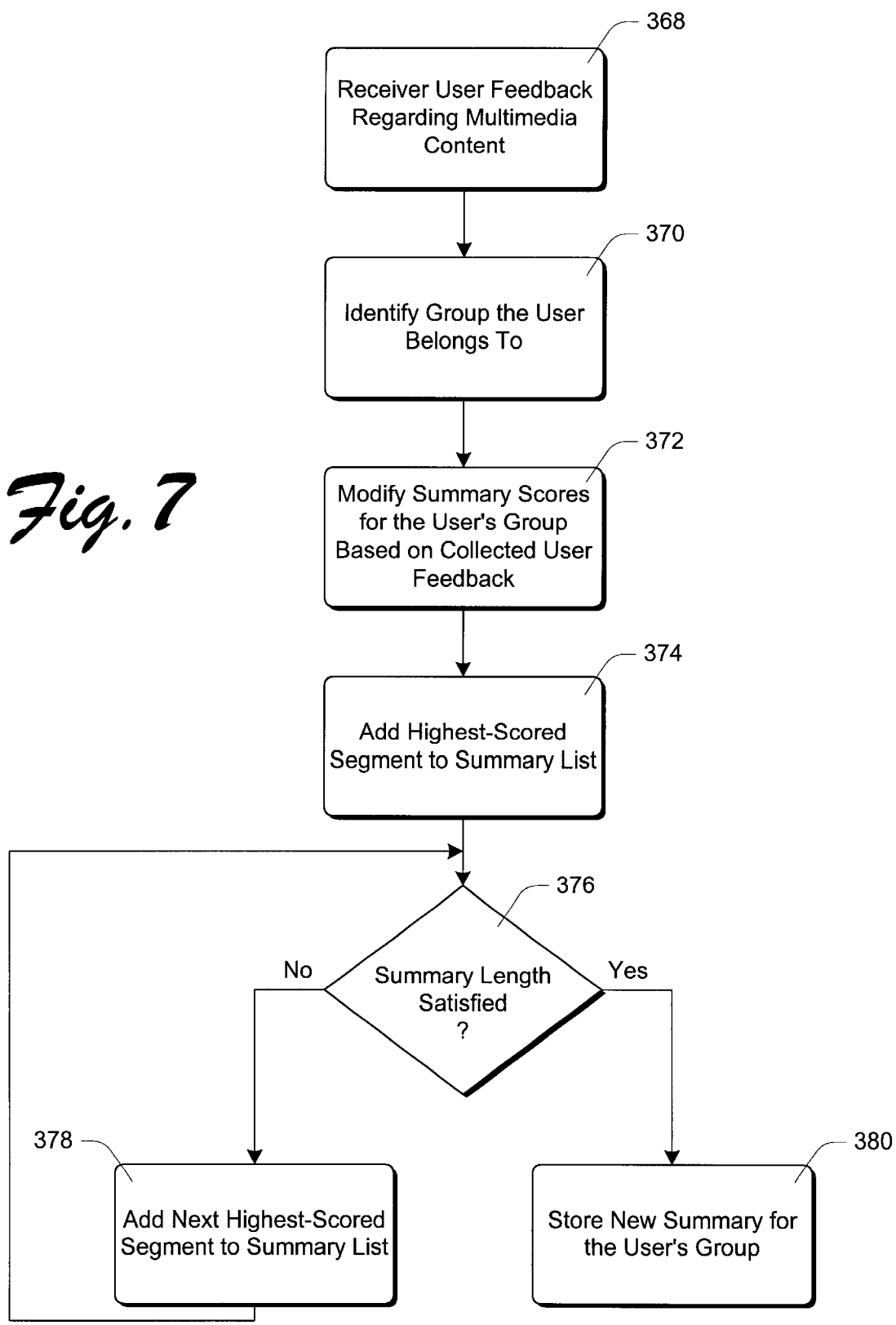
FIG. 7 shows exemplary steps in a process for generating a summary of multimedia content employing user feedback.

FIG. 7 shows exemplary steps in a process for generating a summary of multimedia content employing user feedback. These steps are implemented by multimedia server 104 of FIG. 1 and may be performed in software. FIG. 7 is described with additional reference to components in FIGS. 1 and 3.

At step 368, user feedback regarding multimedia content is received by multimedia server 104. The multimedia server 104 identifies the group the user belongs to, step 370, and modifies the summary scores for the user's group based on the received feedback, step 372.

Once the summary scores have been modified, multimedia server 104 generates the summary by including the most interesting segments (based on the summary scores) from the multimedia content. Multimedia server 104 starts by adding the segment having the highest score to a summary list, step 374. Multimedia server 104 then checks whether the summary duration has been satisfied, step 376. The summary duration is satisfied when the combined presentation times of the segments in the summary list equal or exceed a threshold summary duration. Multimedia server 104 continues to add segments to the summary list, step 378, and check whether the summary duration is satisfied, step 376, until the summary duration is satisfied.

When the summary duration is satisfied, multimedia server 104 stores the new summary for the user's group, step 380. This storage can include storing a list of the multimedia segments in the summary, or alternatively storing the actual media data for the segments in the summary. Alternatively, as discussed above, the summary may be generated "on the fly" when needed rather than being pre-generated.

FIG. 8 shows steps in an alternative process for generating and providing a summary of multimedia content employing user feedback. These steps are implemented by multimedia server 104 of FIG. 1 and may be performed in software. FIG. 8 is described with additional reference to components in FIGS. 1 and 3.

Initially, multimedia server 104 (FIG. 1) receives a summary request from a client computer 108 (FIG. 1), step 386. Upon receipt of the summary request, multimedia server 104 identifies the group that the user belongs to, step 388.

Multimedia server 104 then selects the highest-scored segment for the user's group, step 390, and provides that segment to the client computer 108 for presentation to the user, step 392. Multimedia server 104 then checks whether presentation of the summary is finished, step 394. Presentation of the summary can finish in a variety of manners, such as a summary duration having been satisfied, or a stop playback request being received from a client computer (e.g., in response to user actuation of a stop button).

If presentation of the summary is not finished, multimedia server 104 selects the next highest-scored segment, step 366, and provides that segment to the client computer for presentation to the user, step 392. This selection and presentation process continues until the summary is finished. Once the summary has finished, the multimedia server 104 terminates the selection and provision of segments, step 398.

Figure 9A:
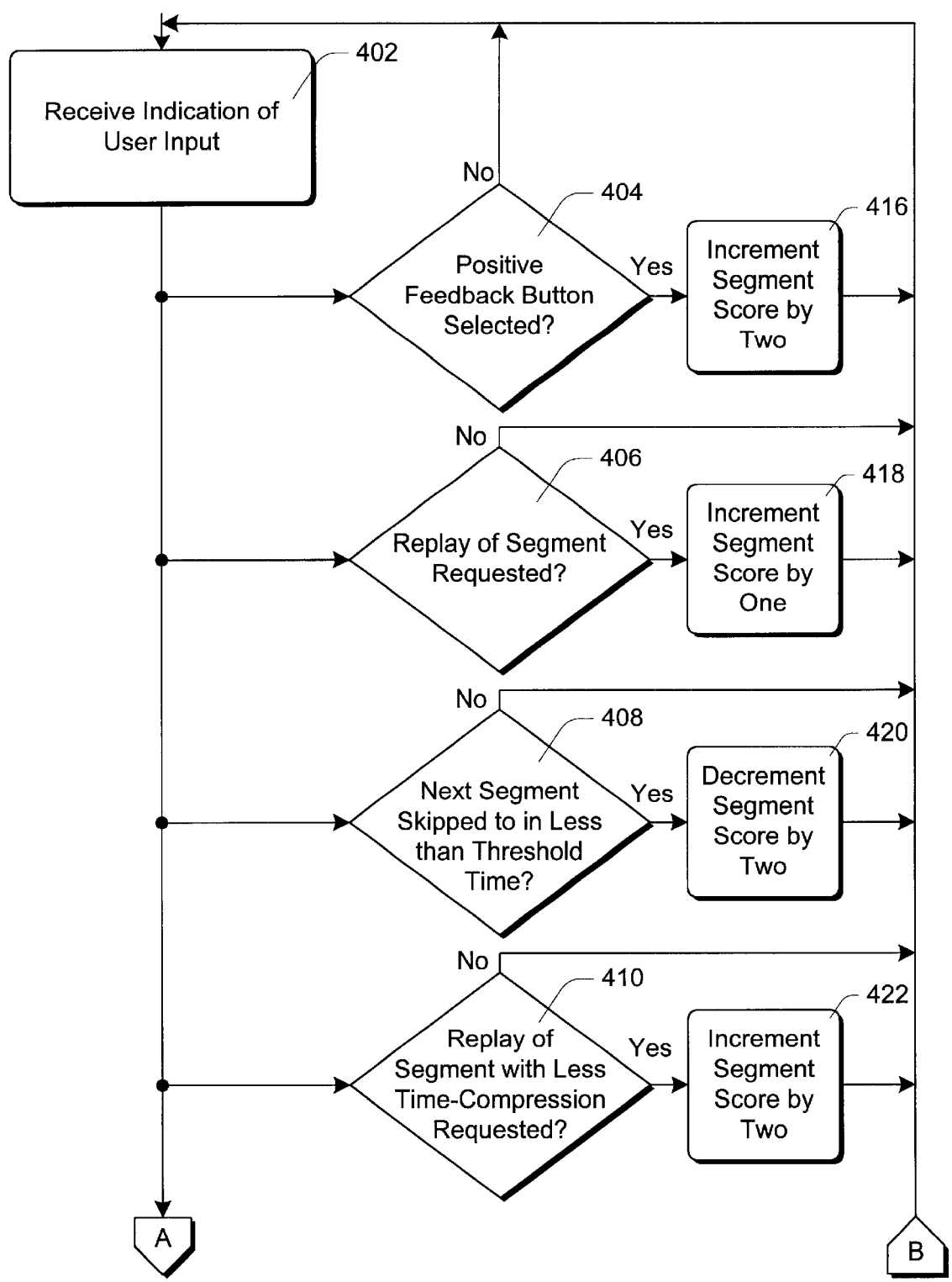
FIGS. 9A and 9B show exemplary steps in a process for modifying segment scores in accordance with the invention.
Figure 9B:
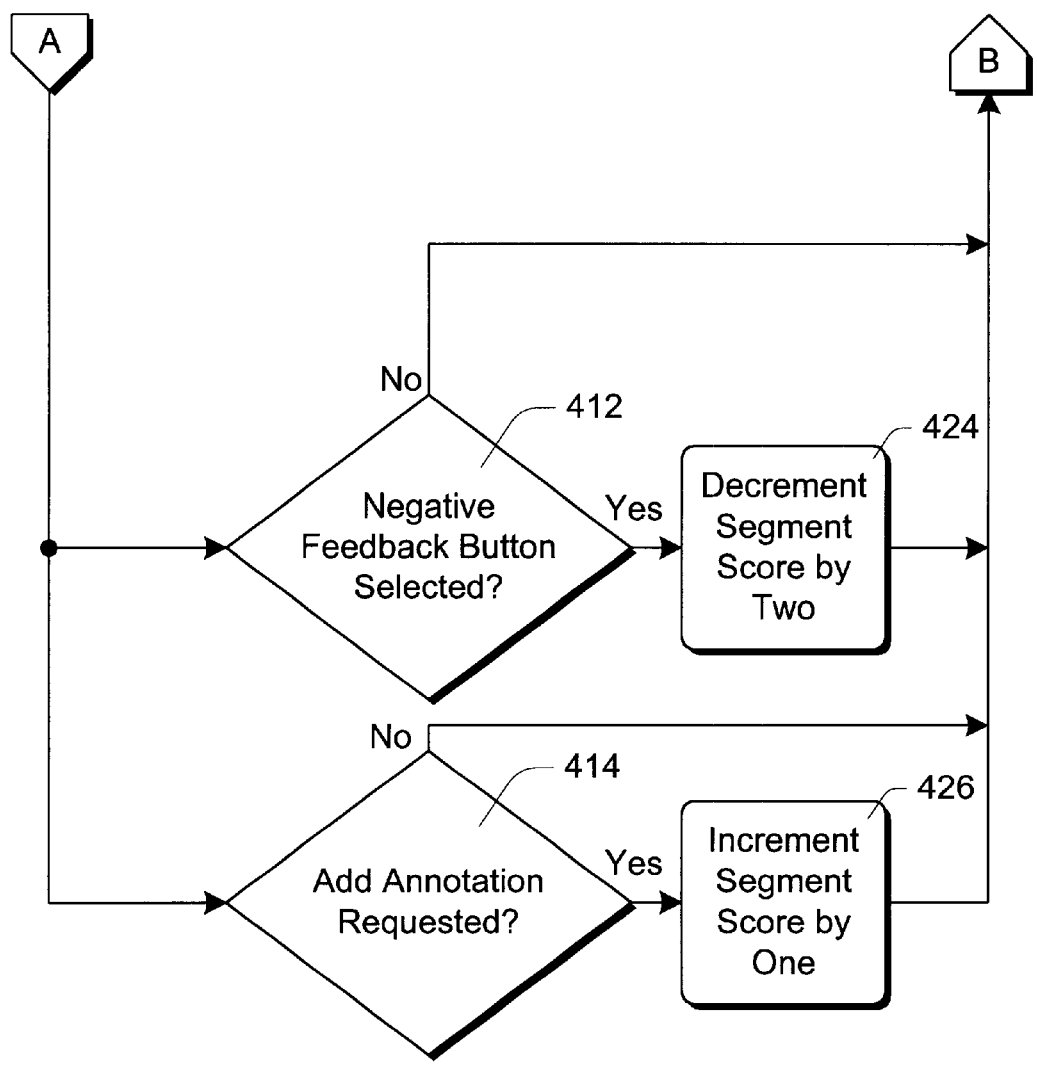

FIGS. 9A and 9B show exemplary steps in a process for modifying segment scores in accordance with the invention. These steps are implemented by multimedia server 104 of FIG. 1 and may be performed in software. These steps are described with additional reference to FIGS. 1, 3 and 5.

Initially, multimedia server 104 (FIG. 1) receives an indication of the user input, step 402. This user input is either explicit or implicit user feedback, such as selection of one of the feedback buttons 328 or 330 of FIG. 5. Multimedia server 104 then proceeds to determine the type of input the user made, checking whether a positive feedback button was selected (step 404), such as selection of positive feedback button 328 of FIG. 5. Multimedia server 104 checks whether replay of a segment was requested (step 406), such as selection of a rewind button of shuttle controls 314 of FIG. 5.

Multimedia server 104 further checks whether the next segment was skipped to in less than a threshold amount of time (step 408). For example, if the user skipped to the next segment using a fast forward button of the shuttle controls 314 of FIG. 5 within five seconds of the beginning of presentation of the current segment. Multimedia server 104 also checks whether replay of a segment with less time compression was requested (step 410), such as by selection of a rewind button of shuttle controls 314 and a slower time compression (e.g., lay button 315(1) of FIG. 5 if play button 315(2) or 315(3) had been previously selected).

Multimedia server 104 additionally checks whether a negative feedback button was selected (step 412), such as selection of negative feedback button 330 of FIG. 5. Multimedia server 104 also checks whether a request to add an annotation was selected (step 414), such as selection of add annotation button 332 of FIG. 5.

The segment score for the corresponding segment is then incremented or decremented by a particular amount (steps 416–426). It should be noted that the checking steps 404–414 can be carried out concurrently, or alternatively could be carried out one after the other.

CONCLUSION

The invention described above provides multimedia summaries employing user feedback. Each multimedia summary is made up of one or more multimedia segments. According to one aspect of the invention, different summaries are maintained for different groups of similar individuals, thereby advantageously providing summaries that are designed to be interesting to particular groups. Additionally, which segment(s) are included in the multimedia summary is advantageously based on explicit and/or implicit feedback from previous similar users.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable storage media having stored thereon a computer program for generating a summary of multimedia content, the program comprising the following steps:

associating a score with each of a plurality of multimedia segments corresponding to the multimedia content;

modifying at least one of the scores based on feedback from a plurality of users; and determining one or more of the plurality of multimedia segments that are part of the summary based at least in part on the scores of each of the plurality of multimedia segments.

2. One or more computer-readable storage media as recited in claim 1, wherein the program further comprises the following steps:

maintaining a separate set of scores for each of a plurality of user groups;

checking which of the plurality of user groups each of the plurality of users is part of; and wherein, for each of the plurality of users, the modifying comprises modifying only scores from the set of scores corresponding to the group the user is part of.

3. One or more computer-readable storage media as recited in claim 1, wherein the determining comprises:

adding individual multimedia segments of the plurality of multimedia segments to a summary list, based at least in part on the scores of each of the plurality of multimedia segments, until a combined presentation time of the multimedia segments in the summary list exceeds a threshold time.

4. One or more computer-readable storage media as recited in claim 1, wherein:

the modifying comprises increasing a score of a multimedia segment in response to positive user feedback regarding the multimedia segment, and decreasing the score of the multimedia segment in response to negative user feedback regarding the multimedia segment; and the determining comprises using the multimedia segments having the highest scores as the summary of the multimedia content.

5. One or more computer-readable storage media as recited in claim 1, wherein the feedback can be explicit feedback or implicit feedback.

6. One or more computer-readable storage media as recited in claim 5, wherein the modifying comprises modifying the at least one of the scores by different amounts based on whether the feedback is explicit feedback or implicit feedback.

7. One or more computer-readable storage media as recited in claim 5, wherein the explicit feedback comprises selection of a positive feedback button.

8. One or more computer-readable storage media as recited in claim 5, wherein the implicit feedback comprises one of:

selection of a rewind button;

selection of a fast forward button;

selection of an add annotation button; and selection of a play button to increase the multimedia playback speed.

9. One or more computer-readable storage media as recited in claim 1, wherein the program further comprises the following step:

ordering the multimedia segments that are part of the multimedia summary for presentation to the user according to the scores of the segments.

10. One or more computer-readable storage media as recited in claim 1, wherein the program further comprises the following step:

ordering the multimedia segments that are part of the multimedia summary for presentation to the user according to the chronological order of the segments in the multimedia content.

11. One or more computer-readable storage media as recited in claim 1, wherein one or more of the plurality of segments is defined dynamically based on accesses, by the plurality of users, to the plurality of multimedia segments.

12. A method of providing a summary of multimedia content, wherein the multimedia content includes a plurality of multimedia segments, the method comprising:

identifying a first group of a plurality of groups to which a user belongs;

identifying a set, corresponding to the first group, of the plurality of multimedia segments, wherein the set of multimedia segments is determined based at least in part on feedback of previous users that belong to the first group; and providing the set of multimedia segments to the user as the summary of the multimedia content.

13. A method as recited in claim 12, wherein the identifying of the set comprises selecting the plurality of multimedia segments for the set and storing information identifying the set prior to providing any of the set of multimedia segments to the user.

14. A method as recited in claim 12, wherein the identifying of the set comprises selecting the plurality of multimedia segments for the set as the summary is being provided to the user.

15. A method as recited in claim 12, wherein the feedback comprises explicit feedback.

16. A method as recited in claim 12, wherein the feedback comprises implicit feedback.

17. A method as recited in claim 12, further comprising collecting, as the summary is provided to the user, feedback from the user and using the collected feedback in identifying sets of the plurality of multimedia segments for provision to subsequent users as the summary of the multimedia content.

18. A method as recited in claim 12, wherein the providing comprises streaming the multimedia segments to a client computer for presentation to the user.

19. A method as recited in claim 12, wherein the providing comprises ordering the multimedia segments in the set for provision to the user according to an order in which more interesting segments are provided prior to less interesting segments.

20. A method as recited in claim 19, further comprising maintaining a record of segment scores identifying which of the multimedia segments are more interesting to users than others.

21. A computer-readable memory containing a computer program that is executable by a computer to perform the method recited in claim 12.

22. A system comprising:
- a client computer configured to present a summary of multimedia content to a user, wherein the user is a member of one of a plurality of different user groups;
- a multimedia server, coupled to the client computer, configured to provide the summary of multimedia content to the client computer, wherein the multimedia content comprises a plurality of multimedia segments;
- a storage device to store summary information for each of the plurality of different user groups, compiled from a plurality of users that are part of the group, identifying feedback from the plurality of users regarding each of the plurality of multimedia segments; and
- wherein the summary comprises a set, determined at least in part based on the summary information of the group of which the user is a part, of the plurality of media segments.

23. A system as recited in claim 22, wherein the multimedia server is configured to provide the summary to the client computer by streaming the set of media segments to the client computer.

24. A system as recited in claim 22, wherein the multimedia server is further configured to receive user feedback from the client computer and update the summary information based on the received feedback.

25. An apparatus comprising:
- a filtering module to maintain summary information corresponding to multimedia content based at least in part on feedback from users having previously been presented with at least a portion of the multimedia content; and
- a multimedia module, coupled to the filtering module, to provide a summary, based on the summary information, to a current user.

26. An apparatus as recited in claim 25, wherein the multimedia module is to stream the summary to a client computer for presentation to the current user.

27. An apparatus as recited in claim 25, wherein the filtering module is further to:
- use the feedback from the users to generate scores for each of a plurality of segments of the multimedia content;
- maintain a plurality of sets of scores, each set corresponding to one of the plurality of user groups;
- assign each user to one of the plurality of groups; and
- modify each set of scores based only on feedback from users in the group corresponding to the set.

28. An apparatus as recited in claim 27, wherein the multimedia module is further to provide the multimedia segments to the current user as the summary based on the scores from the group to which the current user belongs.

29. An apparatus as recited in claim 27, wherein the filter module is further to modify a set of scores by different amounts based on the type of user feedback.

30. An apparatus as recited in claim 29, wherein the types of user feedback include implicit and explicit feedback.

31. An apparatus as recited in claim 25, wherein the multimedia module is further to generate the summary of multimedia content prior to a request by the current user for the summary.

32. An apparatus as recited in claim 25, wherein the multimedia module is further to generate the summary of multimedia content while the summary is being provided to the current user.

\* \* \* \* \*

UNITED STATES PATENT AND TRADEMARK OFFICE
CERTIFICATE OF CORRECTION

PATENT NO.    : 6,557,042 B1
DATED         : April 29, 2003
INVENTOR(S)   : He et al.

It is certified that error appears in the above-identified patent and that said Letters Patent is hereby corrected as shown below:

Column 1,
Line 35, delete the second occurrence of the word "time".

Signed and Sealed this

First Day of July, 2003

JAMES E. ROGAN
*Director of the United States Patent and Trademark Office*